(12) United States Patent
Lin et al.

(10) Patent No.: US 6,241,088 B1
(45) Date of Patent: Jun. 5, 2001

(54) COMPACT DISK RECEIVING DEVICE

(76) Inventors: Cheng-Chien Lin; Shih-Chang Kang, both of 6-21 Floor, No. 109, Shiang-Shin Rd., Nan Twen Dist., Taichung City (TW)

(*) Notice: Subject to any disclaimer, the term of this patent is extended or adjusted under 35 U.S.C. 154(b) by 0 days.

(21) Appl. No.: 09/541,009

(22) Filed: Mar. 31, 2000

(51) Int. Cl.$^7$ .................................................. B65D 85/97
(52) U.S. Cl. ........................ 206/308.1; 206/310; 206/493
(58) Field of Search ........................... 206/307.1, 308.1, 206/309, 310–312, 493; 211/41.12

(56) References Cited

U.S. PATENT DOCUMENTS

| | | | |
|---|---|---|---|
| 4,793,480 | * 12/1988 | Gelardi et al. | 206/312 |
| 5,938,020 | * 8/1999 | Luckow | 206/308.1 |
| 6,119,857 | * 9/2000 | Stumpff | 206/308.1 |
| 6,152,297 | * 11/2000 | Roth et al. | 206/308.1 |

* cited by examiner

Primary Examiner—Paul T. Sewell
Assistant Examiner—Shian Luong
(74) Attorney, Agent, or Firm—Charles E. Baxley

(57) ABSTRACT

A compact disk receiving device includes a cover, a base pivotably connected to the cover, and a support plate located between the cover and the base. A shaft is rotatably engaged between two first lugs extending from a side of the cover. The shaft has a first hook member and the support plate has a second hook member which is engageable with the first hook member so that the support plate is able to be slid between the cover and the base. An opposite side of the side having the first hook member is an open side so that two shafts can be piled up by inserting the first hook member of one shaft into the open side of the other shaft.

8 Claims, 7 Drawing Sheets

COMPACT DISK RECEIVING DEVICE

FIELD OF THE INVENTION

The present invention relates to a compact disk receiving device which can be piled up, wherein the respective support plates of the receiving devices can be individually pulled out.

BACKGROUND OF THE INVENTION

A conventional compact disk receiving device is shown in FIG. 1 and generally includes a base 10 and a cover 11 which is pivotally connected a side of the base 10. An engaging member 12 is located at a center of the base 10 and a compact disk (not shown) is positioned on the base 10 by force-fitting the engaging member 12 with the central hole in the compact disk to let the compact disk be securely engaged with the engaging member 12. In order to collect and manage the compact disks, a box-like receiving device 14 as shown in FIG. 2 is developed, which includes a plurality of separated spaces 13 for respectively receiving the compact disk receiving devices 14 as shown in FIG. 1. Nevertheless, the space 13 has to be large enough to receive the thickness of the assembly of the cover and the base of each compact disk receiving device 15. Whenever the single compact disk receiving device 15 is taken from the space 13, the users have to open the cover to access the compact disk.

The present invention intends to provide a compact disk receiving device that can be piled up and each receiving device has a support plate which can be independently pulled from the pile of the receiving device.

SUMMARY OF THE INVENTION

In accordance with one aspect of the present invention, there is provided a compact disk receiving device and comprising a cover having two first lugs extending from two ends of a side of the cover. A first rod extends from an outside of each first lug. A shaft is rotatably engaged between the two first lugs and a first hook member extends from a side of the shaft. A base has two second lugs extending from two ends of a side of the base and each second lug has an aperture defined therethrough so that the two first rods are respectively engaged with the two apertures. A support plate is located between the cover and the base. An engaging member extends from the support plate and a second hook member extends from a side of the support plate. The second hook member is disengagably engaged with the first hook member.

The object of the present invention is to provide a compact disk receiving device that has a cover, a base pivotally connected to the cover and a support plate located between the cover and the base, wherein the support plate can be pulled out independently between the cover and the base.

Another object of the present invention is to provide a compact disk receiving device that can be piled up and connected with each other. The support plate of each compact disk receiving device can be pulled out individually.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
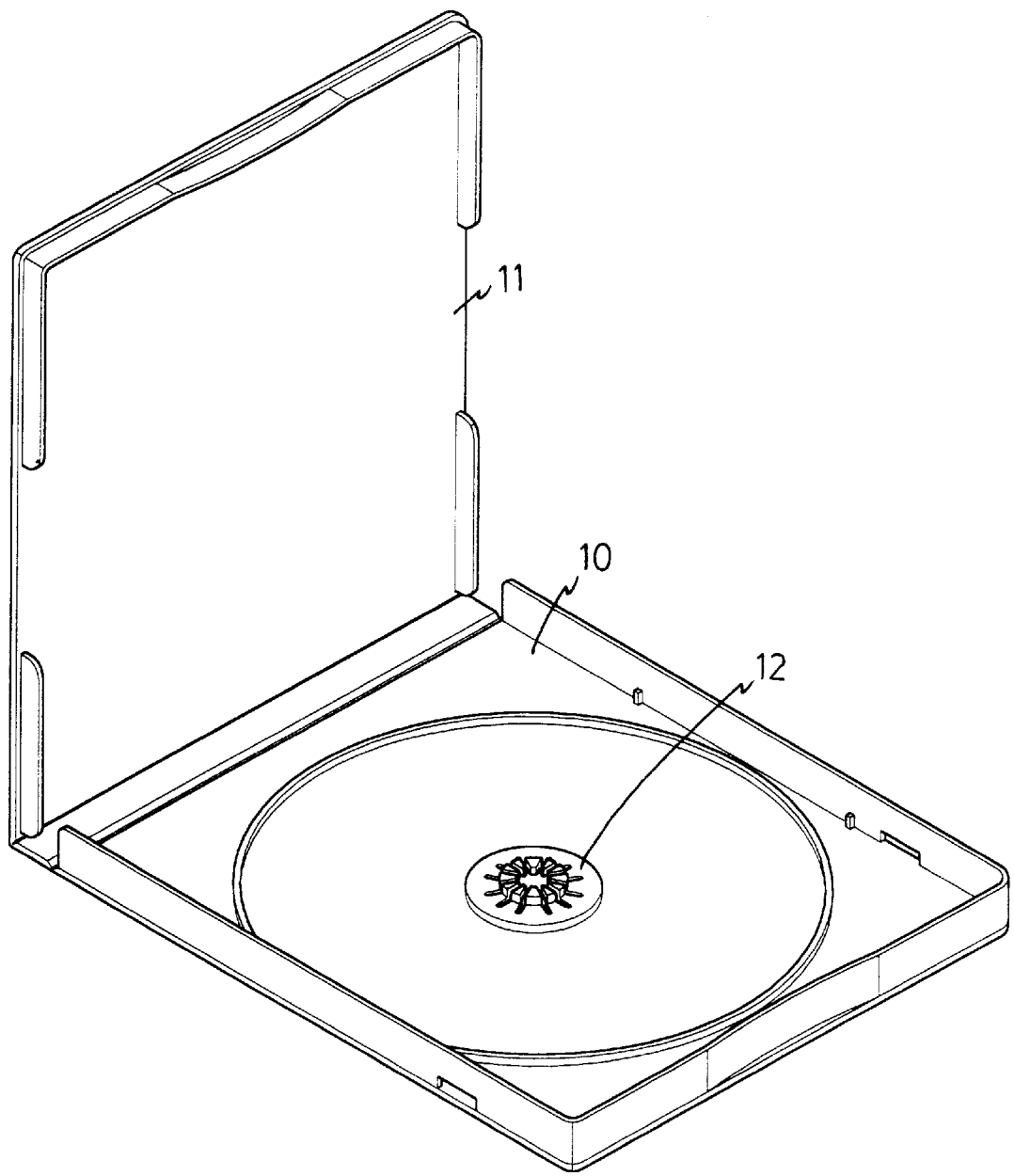
FIG. 1 is a perspective view to show a conventional compact disk receiving device.
Figure 2:
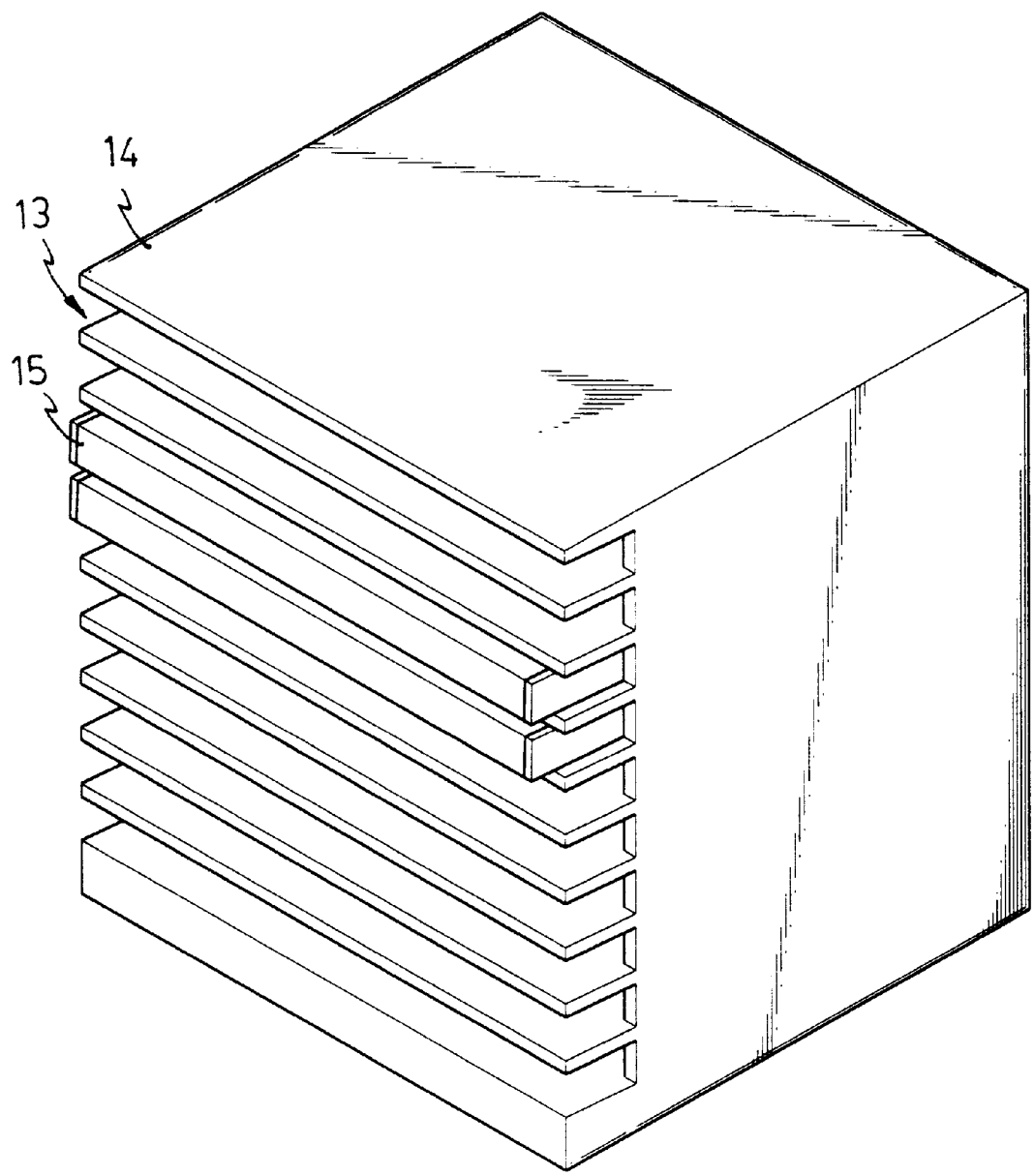
FIG. 2 is a perspective view to show a conventional compact disk receiving box.
Figure 3:
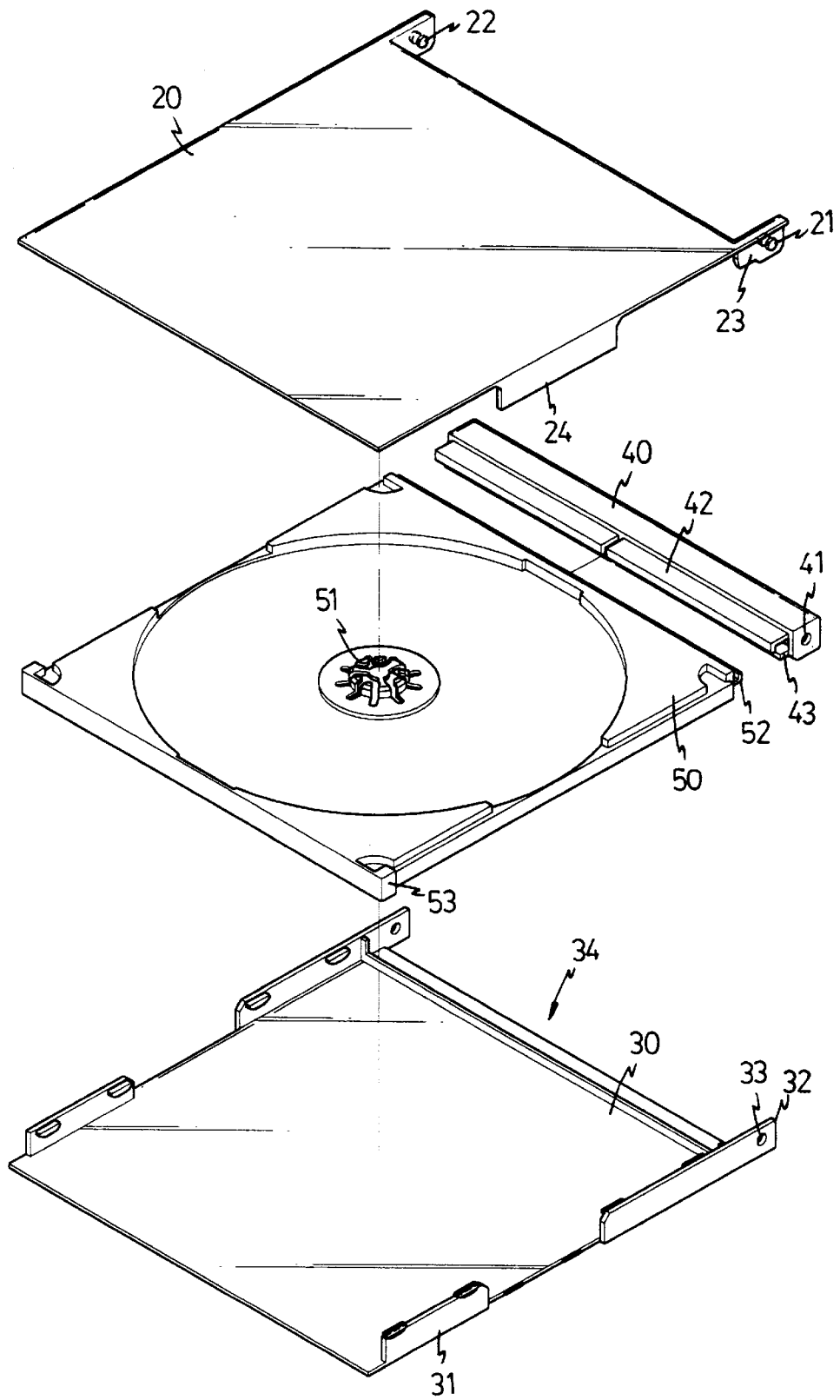
FIG. 3 is an exploded view to show a compact disk receiving device of the present invention.
Figure 4:
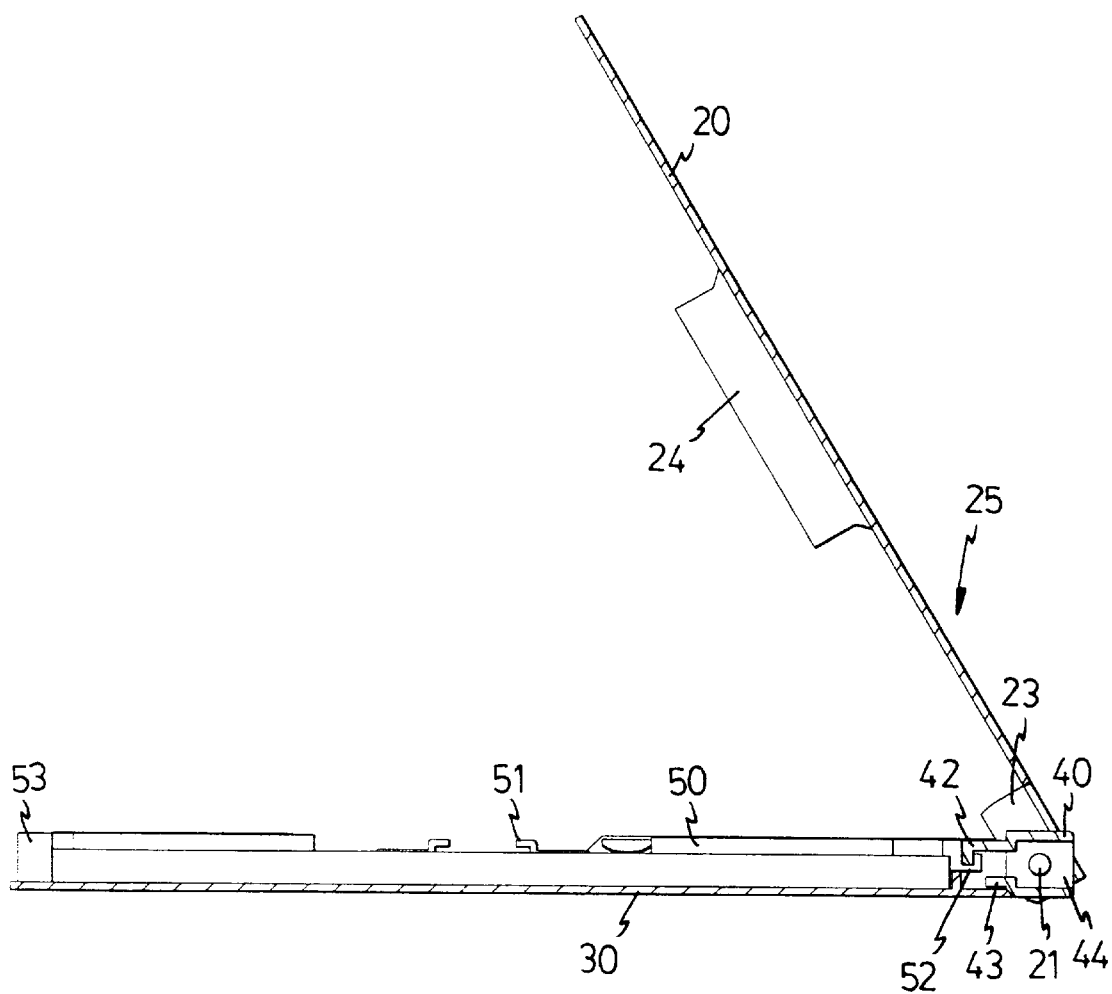
FIG. 4 is a side elevational view, partly in section, of the compact disk receiving device of the present invention.
Figure 5:
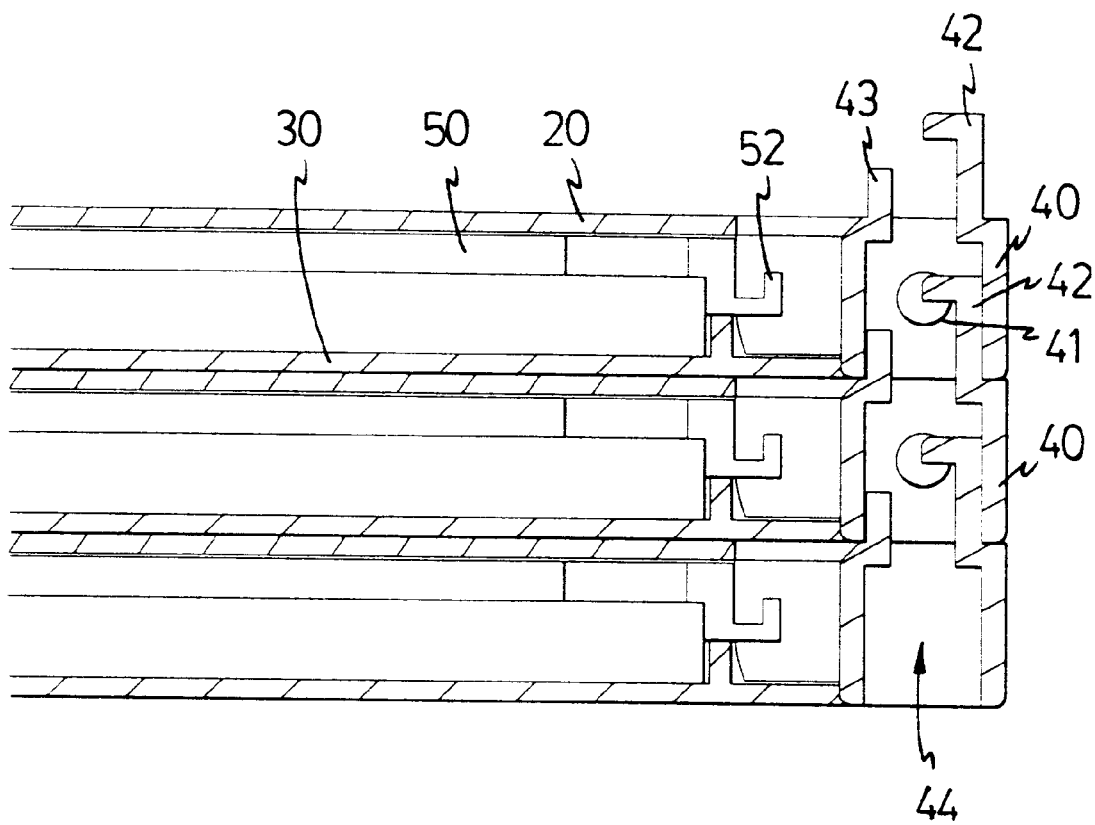
FIG. 5 is an illustrative view to show three compact disk receiving devices of the present invention piled up and connected with each other by the respective shafts.

Referring to FIGS. 3 and 4, the compact disk receiving device of the present invention comprises a cover 20 having two first lugs 23 extending from two ends of a side of the cover 20. A first rod 21 extends from an outside of each first lug 23 and a second rod 22 extends from an inside of each first lug 23. Two first side plates 24 extend from two opposite sides of the cover 20. A shaft 40 has two holes 41 defined in two ends of the shaft 40 and the two second rods 22 are respectively engaged with the two holes 41 so that the shaft 40 is rotatably engaged between the two first lugs 23. Two aligned first hook members 42 extend from a side of the shaft 40 and a pressing plate 43 extends from the shaft 40 and is located below the first hook members 42. As shown in FIGS. 4 and 5, the shaft 40 is a hollow member and an open side 44 is defined in a side opposite to the side having the first hook members 42 extending therefrom. The open side 44 is sized to receive the first hook members 42 and the pressing plate 43 of another shaft 40.

A base 30 has two second lugs 32 extending from two ends of a side of the base 30 and each second lug 32 has an aperture 33 defined therethrough. The two first rods 21 are respectively engaged with the two apertures 33. Two second side plates 31 extend from two opposite sides of the base 30 so that when the cover 20 is mounted to the base 20, the first side plates 24 and the second side plates 31 close the gap on two sides between the cover 20 and the base 30.

A support plate 50 is located between the cover 20 and the base 30. An engaging member 51 as known in the art extends from the support plate 50 for positioning a compact disk (not shown), and a second hook member 52 extends from a side of the support plate 50. The second hook member 52 is disengagably engaged with the first hook members 42. A positioning plate 34 extends from the base 30 and is located between the two second lugs 32. The positioning plate 34 is pressed by the pressing plate 43 when the first hook member 42 is engaged with the second hook member 52 as shown in FIG. 4. The cover 20 can be pivoted away from the support plate 50 to let the user access the compact disk on the support plate 50. Two protrusions 53 respectively extend from two ends of a side located in opposite to the side having the second hook member 52 of the support plate 50.

Figure 6:
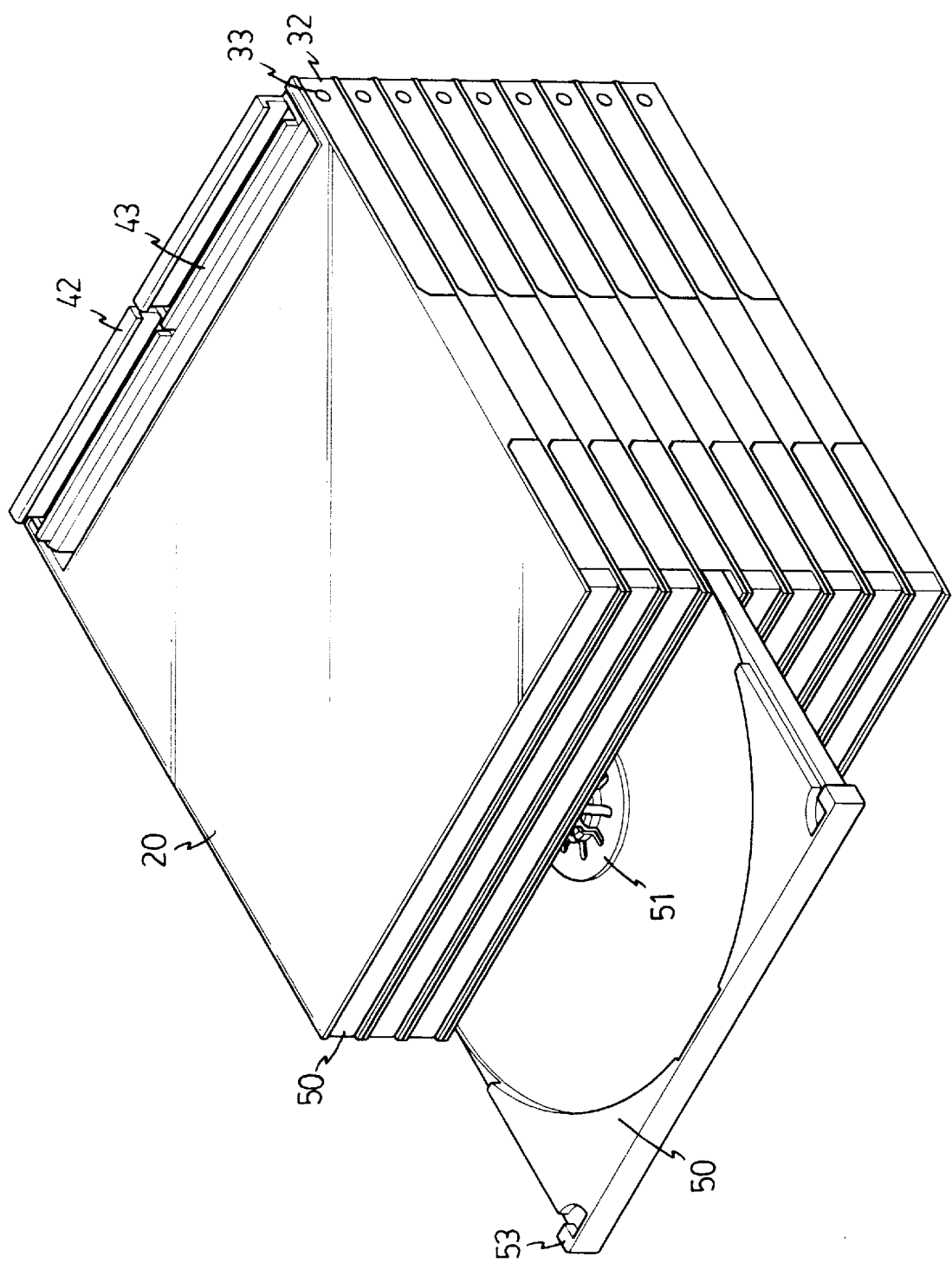
FIG. 6 is a perspective view to show the piled compact disk receiving devices of the present invention, wherein a support plate of one of the compact disk receiving devices is pulled out.

As shown in FIGS. 5 and 6, before piling the compact disk receiving devices, the second hook member 52 is disengaged from the first hook members 42, and the shaft 40 is pivoted so that the first hook members 42 and the pressing plate 34 on a lower shaft 40 are engaged with the open side 44 of an upper shaft 40. By this way, the shafts 40 can be securely piled up as shown in FIG. 6. The respective support plate 50 can therefore pulled out individually by holding the two protrusions 53 and pull.

The compact disk receiving device of the present invention can be used individually as that does for the conventional compact disk receiving device. The piled compact disk receiving devices can be used as a receiving box.

Figure 7:
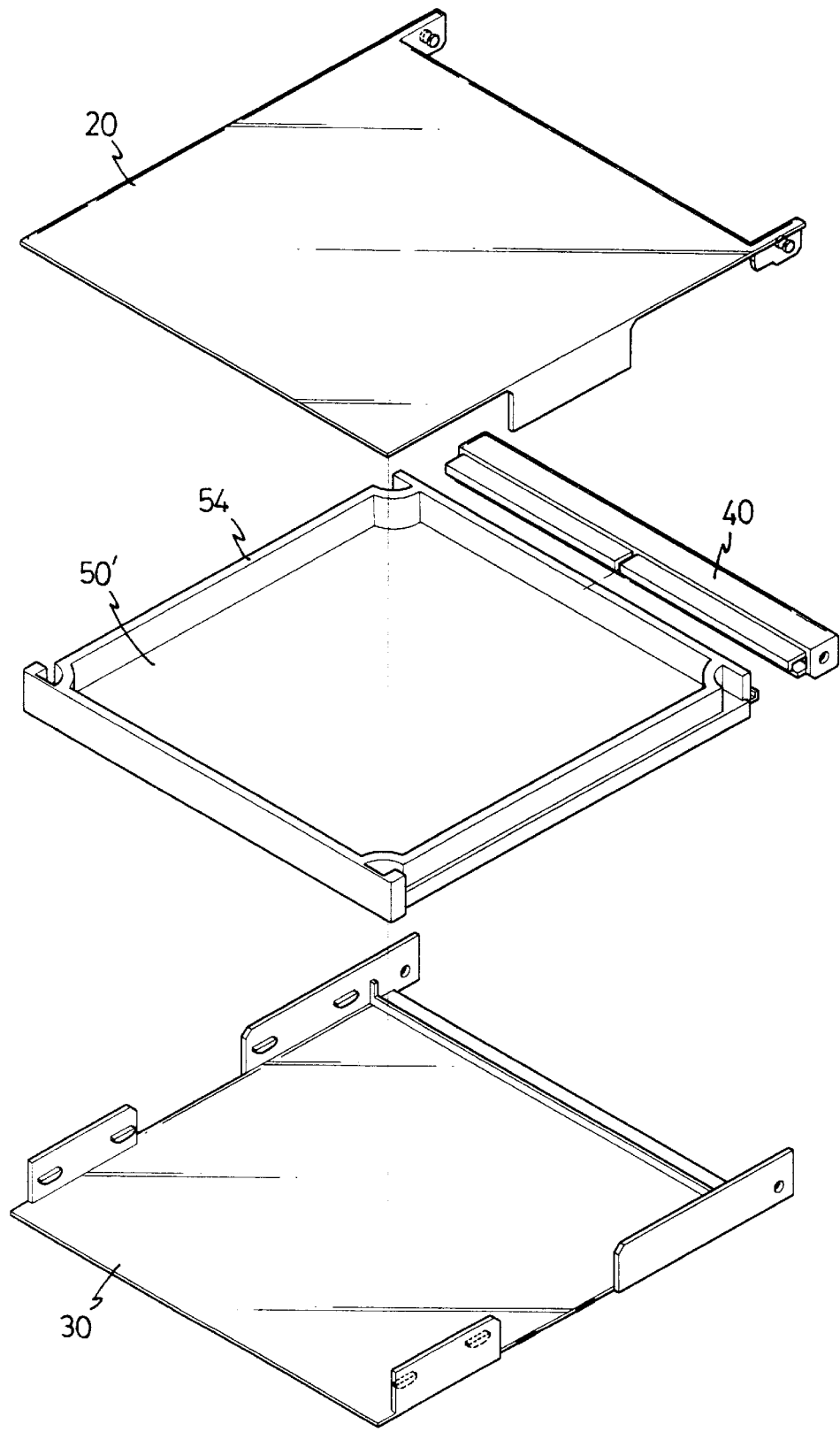
FIG. 7 is an exploded view to show that the receiving device is used as a drawer.

FIG. 7 shows that the support plate 50' has four sidewalls extending from a periphery thereof and no engaging member 51 located on the 50'. The support plate 50' is located between the cover 20 and the base 30, and support plate 50' is connected to the shaft 40. The 50' is therefore used as a drawer and receives objects (not shown) in the support plate 50'.

While we have shown and described various embodiments in accordance with the present invention, it should be clear to those skilled in the art that further embodiments may be made without departing from the scope and spirit of the present invention.

What is claimed is:

1. A compact disk receiving device comprising:

a cover having two first lugs extending from two ends of a side of said cover, a first rod extending from an outside of each first lug;

a shaft rotatably engaged between said two first lugs, at least one first hook member extending from a side of said shaft;

a base having two second lugs extending from two ends of a side of said base, each second lug having an aperture defined therethrough, said two first rods respectively engaged with said two apertures, and a support plate located between said cover and said base, a second hook member extending from a side of said support plate, said second hook member disengagably engaged with said at least one first hook member.

2. The receiving device as claimed in claim 1 further comprising an engaging member extending from said support plate.

3. The receiving device as claimed in claim 1 further comprising a pressing plate extending from said shaft and located below said at least one first hook member, a positioning plate extending from said base and located between said two second lugs, said positioning plate being pressed by said pressing plate when said at least one first hook member is engaged with said second hook member.

4. The receiving device as claimed in claim 1 further comprising two protrusions respectively extending from two ends of a side located in opposite to said side having said second hook member of said support plate.

5. The receiving device as claimed in claim 1 further comprising two first side plates extending from two opposite sides of said cover, two second side plates extending from two opposite sides of said base.

6. The receiving device as claimed in claim 3, wherein said shaft is a hollow member and an open side is defined in a side opposite to said side having said at least one first hook member extending therefrom.

7. The receiving device as claimed in claim 6, wherein said open side is sized to receive said at least one first hook member and said pressing plate therein.

8. The receiving device as claimed in claim 1 further comprising a second rod extending from an inside of each first lug, said shaft having two holes defined in two ends of said shaft, said two second rods respectively engaged with said two holes.

* * * * *